April 13, 1937.  P. TUCKER  2,076,972
FISH AND CRAB TRAP
Filed Aug. 15, 1935
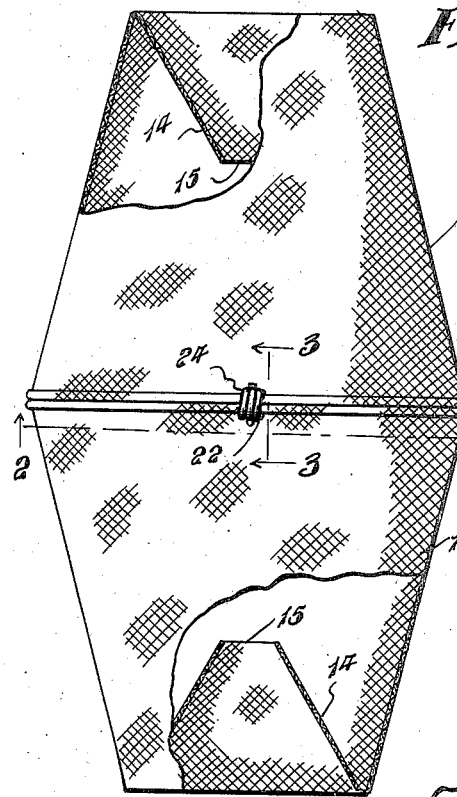
Fig. 1.
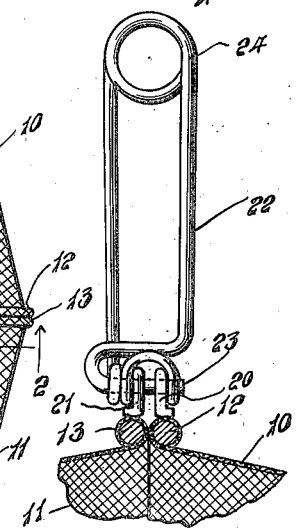
Fig. 3.
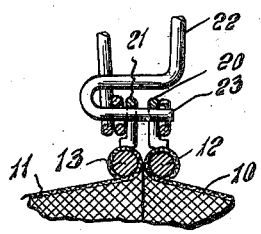
Fig. 4.
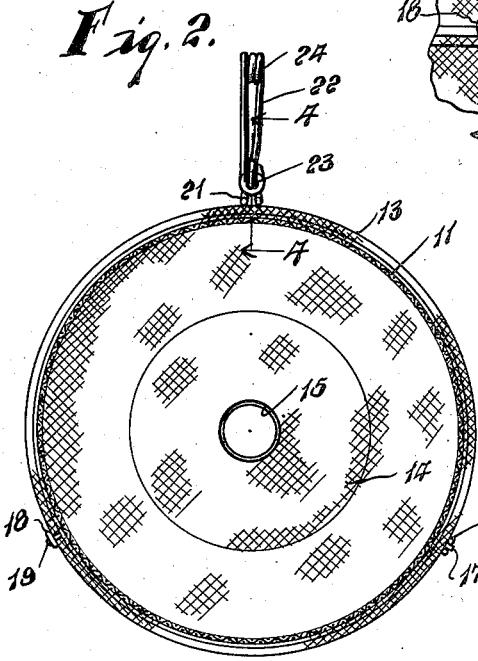
Fig. 2.
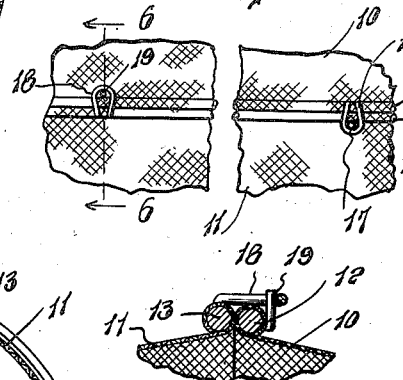
Fig. 5.
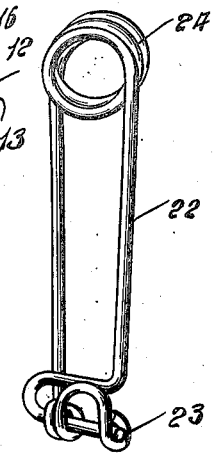
Fig. 7.
Fig. 6.
Inventor
Perry Tucker
By L. F. Randolph Jr.
Attorney Patented Apr. 13, 1937

2,076,972

UNITED STATES PATENT OFFICE 2,076,972

FISH AND CRAB TRAP

Perry Tucker, Houghton, N. Y.

Application August 15, 1935, Serial No. 36,432

1 Claim. (Cl. 43—65)

The invention relates to traps for fish, crabs, etc., and has for its principal object the provision of a trap that comprises two identical sections that are frusto-conical in contour and constructed of open wire fabric, the smaller ends of said sections carrying conical-shaped entrances extending into them, while the larger ends are held suspended by means of metal rings secured to the edges of the sections, said sections being provided with means for attaching them together to make a complete receptacle, said means being readily detachable for emptying the trap when desired.

The invention will be described in detail hereinafter and will be found illustrated in the accompanying drawing, in which Figure 1 is a top plan view of the trap showing it in assembled position, and partly broken away and in section;

Figure 2 is a transverse sectional view on a plane indicated by the line 2—2 of Figure 1;

Figure 3 is a sectional detail on a plane indicated by the line 3—3 of Figure 1 showing the device in position for use;

Figure 4 is a view similar to Figure 3 shown fragmentarily, and taken on the same plane, with parts broken away and in section;

Figure 5 is a fragmentary bottom plan view showing the means for joining the sections of the trap together;

Figure 6 is a sectional detail on the plane indicated by the line 6—6 of Figure 5; and Figure 7 is a view in perspective of the pin clasp for holding the parts of the trap together.

In the drawing, in which similar reference characters are used to designate corresponding parts in all of the views, is disclosed an improved construction of fish and crab trap that comprises two sections designated 10 and 11, respectively, said sections being frusto-conical in shape and having their larger ends spread and held in distended position by means of rings 12 and 13, respectively, the body of the sections being constructed of a wire mesh fabric, said fabric being of sufficient rigidity to sustain the sections in extended position. The smaller ends of the sections 10 and 11 have inturned conical entrances 14, that are preferably a continuation of the outer portions of the sections, but if desired, may be made of a separate piece of material, said entrance portions 14 being also frusto-conical and tapering inwardly of the trap and provided with a reduced opening 15 for ingress of fish and crabs, and the like.

It is desirable in a trap of the type described that the sections be held rigidly together when being used for trapping fish and crabs, but that the sections may be readily separated when desired to empty the trap, and to that end a fastening means is provided comprising a loop 16 secured to the ring 12 and overlapping the ring 13, a stud 17 being secured to the inner side of ring 13 and engaging in the loop 16. Spaced from the loop 16 and stud 17 is another loop 18 secured to the ring 13 and overlapping the ring 12, the ring 13 being provided with a stud 19 to engage in the loop 18. This fastening means is on the underside of the trap and the rings 12 and 13, and it will be apparent that the loops 16 and 18 mutually support rings 13 and 12, and the respective sections 11 and 10. On the upper side of the trap and rings, the rings 12 and 13 are provided with angular loops 20 and 21, respectively, said loops 20 and 21 having their bight ends extended radially from the trap and rings.

It has been found that by having the loops 16 and 18 and pins 17 and 19 spaced substantially one-third the circumference of the respective rings 12 and 13, that when the sections 10 and 11 are held assembled through loops 20 and 21 a very substantial trap is the result, and danger of the parts becoming misshaped is avoided.

To secure the sections together a spring pin clasp 22 is provided having an entering portion 23, and an intermediate coiled spring loop 24 that not only provides resilience to hold the entering portion 23 in engagement with the loops 20 and 21 but also provides means for suspending the trap in the water by means of a rope or chain or the like. A further description of the spring pin fastener 22 is not made at this time, as this article is being made the subject-matter of a separate application for patent.

In assembling the two parts it will be readily apparent that by entering one of the studs either 17 or 19 in its mating loop 16 or 18, then rolling the rings into axially alined position, the loops 20 and 21 will be brought into alinement and may be fastened by any desired means including the pin fastner shown in the drawing. To open the trap it is only necessary to remove the fastening from the loops 20 and 21 and the two sections of the trap may be separated for removing the contents thereof.

What is claimed is:—

In a fish and crab trap, two similar substantially frusto-conical sections, each of said sections having a spaced loop and pin adapted to engage a pin and loop on the other section, each pin being straight and extending tangentially from its ring and radially to the axis of its section, the loop on each section underlying the ring on the other section to support it, and said sections being connected together by engaging the pin on one section in the loop on the other section and rolling said sections on substantially parallel axes until the axes of the sections are in alinement.

PERRY TUCKER.